United States Patent

Yamaguchi et al.

[11] Patent Number: 6,135,914
[45] Date of Patent: Oct. 24, 2000

[54] HYBRID VEHICLE

[75] Inventors: Kozo Yamaguchi; Hideki Hisada, both of Aichi-ken, Japan

[73] Assignee: Kabushikikaisha Equos Research, Japan

[21] Appl. No.: 09/328,458

[22] Filed: Jun. 9, 1999

[30] Foreign Application Priority Data

Jun. 19, 1998 [JP] Japan .................................. 10-173140

[51] Int. Cl.⁷ .................................................. B60K 6/04
[52] U.S. Cl. ........................... 477/3; 180/65.2; 180/65.4; 475/5; 475/151
[58] Field of Search .................................. 477/2, 3, 110; 475/149, 150, 151, 5; 180/65.2, 65.4

[56] References Cited

U.S. PATENT DOCUMENTS

| | | | |
|---|---|---|---|
| 3,566,717 | 3/1971 | Berman et al. | 475/151 |
| 5,087,230 | 2/1992 | Yates et al. | 475/151 |
| 5,643,119 | 7/1997 | Yamaguchi et al. | 475/5 |
| 5,775,449 | 7/1998 | Moroto et al. | 180/65.2 |
| 5,788,006 | 8/1998 | Yamaguchi | 180/65.2 |
| 5,791,427 | 8/1998 | Yamaguchi | 180/65.3 |
| 5,799,744 | 9/1998 | Yamaguchi et al. | 180/65.2 |
| 5,806,617 | 9/1998 | Yamaguchi | 180/65.2 |
| 5,823,281 | 10/1998 | Yamaguchi et al. | 180/65.2 |
| 5,823,282 | 10/1998 | Yamaguchi | 180/65.2 |
| 5,865,263 | 2/1999 | Yamaguchi et al. | 180/65.2 |
| 5,899,286 | 5/1999 | Yamaguchi | 180/65.3 |
| 5,915,489 | 6/1999 | Yamaguchi | 180/65.2 |
| 5,991,683 | 11/1999 | Takaoka et al. | 477/3 |

*Primary Examiner*—Sherry Estremsky
*Attorney, Agent, or Firm*—Lorusso & Loud

[57] ABSTRACT

A hybrid vehicle is powered by a drive system including an internal combustion engine (11), a generator (16) and an electric motor (25). A differential gear unit (13) is arranged between the engine and the generator, which includes at least three gear elements, the first (S) being connected to the generator, the second (R) being connected to a torque output shaft (14) and the third (CR) being connected to the engine. A controller (51) is operated to control an engine speed based on an output rotation speed of the second gear element or torque output shaft detected by a sensor (53), so that rotation of the generator is restricted even if some accident happens to the generator.

26 Claims, 6 Drawing Sheets

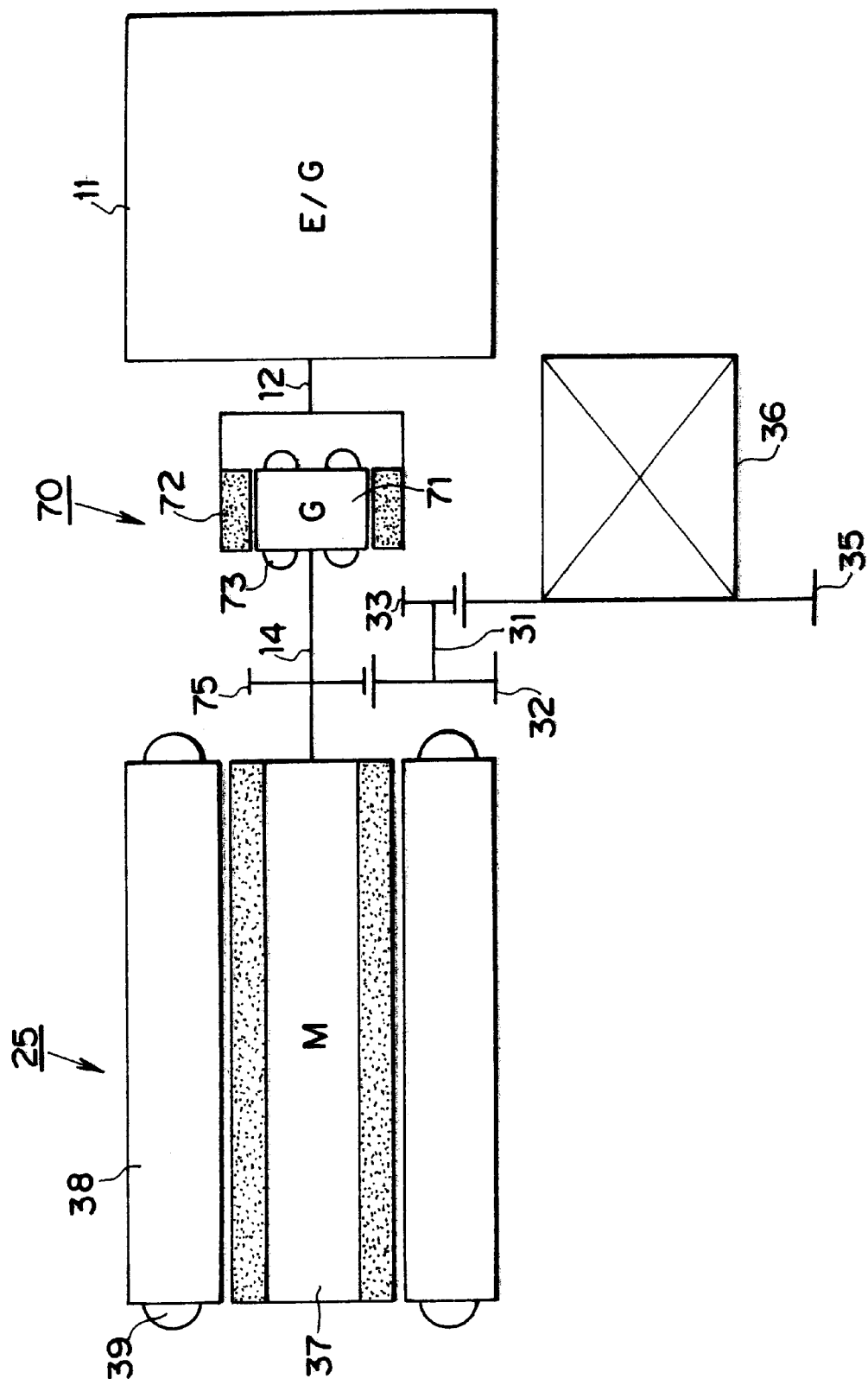

HYBRID VEHICLE

BACKGROUND OF THE INVENTION

1. Field of the Invention

The present invention relates to a hybrid vehicle of the type driven by combination of an internal combustion engine (hereinafter referred to as "engine") and an electric motor (hereinafter referred to as "motor").

2. Description of the Prior Art

In one type of the conventional hybrid vehicles, an engine and a motor are connected to each other. This type has three drive modes, the first being operated only by the engine, the second being operated only by the motor and the third being operated by combination of the engine and the motor.

Another type of the conventional hybrid vehicles includes an engine and an electric generator connected to each other so that a part of the output energy from the engine is transmitted to the generator. The remainder of the output energy is transmitted directly to an output drive shaft. The hybrid vehicle of this type provides an improved fuel consumption because the engine may be run at peak efficiency with a controlled reaction force of the generator and all of the output energy from the engine may be utilized for generation of electricity.

However, in such conventional hybrid vehicles, the generator's revolution is increased to an extraordinary high level when it becomes uncontrollable due to accident to a control system of the generator, cutoff of a line from a power source, short circuit of a stator coil, etc. This could be prevented by providing a sensor that detects the generator's revolution and a control unit that operates when the generator's revolution exceeds a predetermined one to enhance the electricity generation to thereby absorb the engine torque. However, this solution requires an oversize generator, which inevitably increases the overall weight of the hybrid vehicle.

SUMMARY OF THE INVENTION

It is therefore an object of the present invention to provide a hybrid vehicle which provides a novel safeguard for preventing the generator from running at an extraordinary high revolution, without increasing size and weight of the generator and the vehicle.

According to an aspect of the present invention there is provided a hybrid vehicle comprising an internal combustion engine for generating mechanical energy; a generator for converting said mechanical energy into electricity; an electric motor driven by said electricity to output rotational power through an output shaft; a differential gear unit including at least three gear elements, the first being connected to said generator, the second being connected to said output shaft and the third being connected to said internal combustion engine; a speed sensor for detecting an output rotational speed of said second gear element; and a controller operated in response to the output rotational speed detected by said speed sensor to control a speed of said engine not to exceed a predetermined upper limit speed.

In a preferred embodiment of this aspect of the present invention, the controller controls the engine speed based on a current vehicle speed which is determined by the output rotational speed of the second gear element detected by the speed sensor. In an example, the controller stores a map showing relationship between recommended upper limit of the engine speed and the vehicle speed, and controls the engine speed not to exceed the recommended upper limit speed at the current vehicle speed, in reference to the map. The controller may control the engine speed by reducing an engine torque produced by the engine.

According to another aspect of the present invention there is provided a hybrid vehicle comprising an internal combustion engine for generating mechanical energy; a generator for converting said mechanical energy into electricity; an electric motor driven by said electricity to output rotational power through an output shaft; a differential gear unit including at least three gear elements, the first being connected to said generator, the second being connected to said output shaft and the third being connected to said internal combustion engine; a speed sensor for detecting an output rotational speed of said second gear element; and a controller operated in response to the output rotational speed detected by said speed sensor to control an engine torque not to exceed a predetermined upper limit.

In a preferred embodiment of this aspect of the present invention, the controller controls the engine torque based on a current vehicle speed which is determined by the output rotational speed of the second gear element detected by the speed sensor. The controller may be operated to reduce an engine throttle opening to thereby restrict the engine torque. The controller may be operated to reduce a quantity of fuel to be injected into the engine to thereby restrict the engine torque. The controller may be operated to stop ignition to the engine or change ignition timing to thereby restrict the engine torque. The controller may be operated to change compression ratio of a gas mixture to be introduced into the engine to thereby restrict the engine torque. The controller may be operated to change open/close timing of valves in the engine to thereby restrict the engine torque.

According to still another aspect of the present invention there is provided a hybrid vehicle comprising an internal combustion engine for generating mechanical energy; a double rotary generator including a first rotor connected to said engine and a second rotor, rotatable relative to said first rotor, connected to an output shaft, said generator converting said mechanical energy into electricity; an electric motor driven by said electricity to output rotational power through said output shaft; a speed sensor for detecting an output rotation speed of said torque output shaft; and a controller operated in response to the output rotational speed detected by said speed sensor to control a speed of said engine not to exceed a predetermined upper limit speed.

In a preferred embodiment of this aspect of the present invention, the controller controls the engine speed based on the current vehicle speed which is determined by the output rotational speed of the output shaft detected by the speed sensor. In an example, the controller stores a map showing relationship between recommended upper limit of the engine speed and the vehicle speed, and controls the engine speed not to exceed the recommended upper limit speed at the current vehicle speed, in reference to the map. The controller may control the engine speed by reducing an engine torque produced by the engine.

According to still another aspect of the present invention there is provided a hybrid vehicle comprising an internal combustion engine for generating mechanical energy; a double rotary generator including a first rotor connected to said engine and a second rotor, rotatable relative to said first rotor, connected to an output shaft, said generator converting said mechanical energy into electricity; an electric motor driven by said electricity to output rotational power through said output shaft; a speed sensor for detecting an output rotational speed of said output shaft; and a controller operated in response to the output rotational speed detected by said speed sensor to control an engine torque not to exceed a predetermined upper limit.

In a preferred embodiment of this aspect of the present invention, the controller controls the engine torque based on a current vehicle speed which is determined by the output rotational speed of the second gear element detected by the speed sensor. The controller may be operated to reduce an engine throttle opening to thereby restrict the engine torque. The controller may be operated to reduce a quantity of fuel to be injected into the engine to thereby restrict the engine torque. The controller may be operated to stop ignition to the engine or change ignition timing to thereby restrict the engine torque. The controller may be operated to change compression ratio of a gas mixture to be introduced into the engine to thereby restrict the engine torque. The controller may be operated to change open/close timing of valves in the engine to thereby restrict the engine torque.

BRIEF DESCRIPTION OF THE DRAWINGS

The foregoing and other objects and features of the present invention can be apparent from the following description when read in conjunction with the accompanying drawings in which:

FIG. 9 is a schematic view of a series type drive unit of a hybrid vehicle according to another embodiment of the present invention.

DETAILED DESCRIPTION OF PREFERRED EMBODIMENTS

Figure 2:
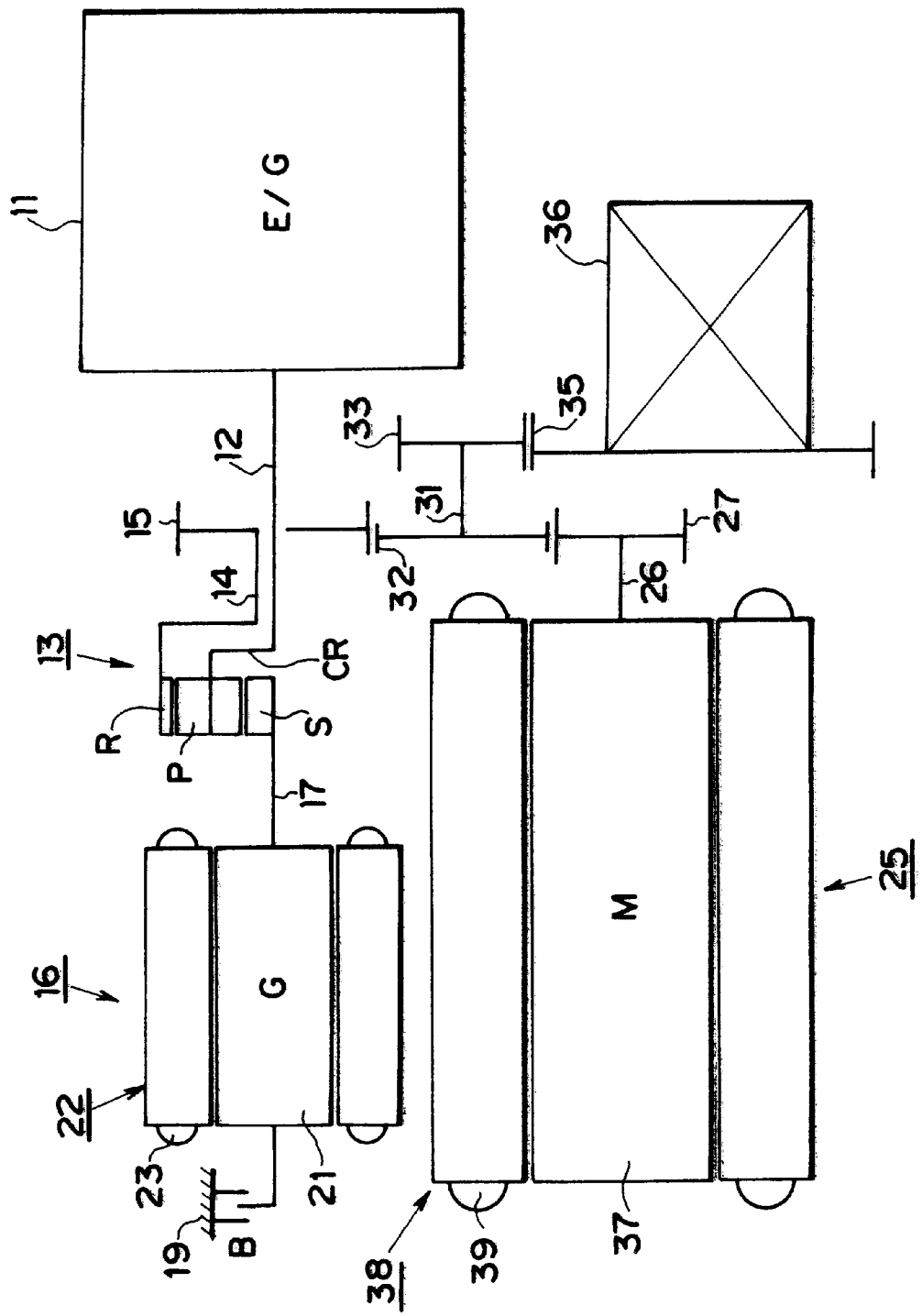
FIG. 2 is a schematic view of a parallel type drive unit of the hybrid vehicle according to the first embodiment.

Referring first to FIG. 2 showing a complete drive unit of the hybrid vehicle according to a first embodiment of the present invention, an engine (E/G) 11 is connected to a cooling unit such as a radiator (not shown) to prevent overheating of engine 11 in operation. An engine output shaft 12 is connected to engine 11 for transmitting power from engine 11 to a planetary gear unit 13 which serves as a differential gear unit to change speed of rotation received from engine output shaft 12. Another output shaft 14 receives the output from planetary gear unit 13. Output shaft 14 is in the form of a sleeve which concentrically surrounds engine output shaft 12. A first counter drive gear 15 is secured to output shaft 14 and arranged at one side of planetary gear unit 13. At the other side of planetary gear unit 13 is arranged a generator (G) 16 which is also connected to planetary gear unit 13 through a transmission shaft 17 aligned with engine output shaft 12.

Planetary gear unit 13 consists of a sun gear S as a first gear element, a pinion P meshing with sun gear S, a ring gear R as a second gear element meshing with pinion P and a carrier CR as a third gear element rotatably carrying pinion P. Sun gear S is connected to generator 16 through shaft 17. Ring gear R is connected to output shaft 14. Carrier CR is connected to engine 11 through engine output shaft 12.

Generator 16 is secured to transmission shaft 17 and consists of a free-rotatable rotor 21, a stator 22 arranged around rotor 21 and a coil 23 wound around stator 22. Accordingly, generator 16 is adapted to generate electricity by the output power from engine 11 which is transmitted to generator 16 through engine output shaft 12, planetary gear unit 13 and transmission shaft 17. Coil 23 is connected to a battery (not shown) which is charged with the generated electricity. A brake B arranged in a casing 19 is engageable with rotor 21 for stopping rotor 21.

An electric motor (M) 25 is connected to the battery and includes a rotor 37, a stator 38 arranged around rotor 37 and a coil 39 wound around rotor 38, so that it outputs rotary power or torque with electricity supplied to coil 39 from the battery. The motor torque from motor 25 is output through a motor output shaft 26 to which a second counter drive gear 27 is connected. When the hybrid vehicle is decelerating, motor 25 receives rotation of drive wheels (not shown) to generate a regenerative electricity which is supplied to the battery for charging.

A counter shaft 31 extends in parallel with motor output shaft 26 to rotate the drive wheels in the same direction as engine 11. A counter driven gear 32 is secured to counter shaft 31, which meshes with first counter drive gear 15 on engine output shaft 12 and also with second counter drive gear 27 on motor output shaft 26. Accordingly, counter driven gear 32 receives rotation of first and second drive gears 15, 17 to rotate in the opposite direction. Counter shaft 31 further carries, securely connected thereto, a pinion gear 33 having smaller diameter and less teeth than counter driven gear 32. A differential gear unit 36 is secured to a ring gear 35 which meshes with pinion gear 33 so that rotation received by ring gear 35 is transmitted to and changed into differential motion in differential gear unit 36 to thereby drive the wheels.

Thus, counter driven gear 32 is arranged to receive power not only from engine 11 but also from motor 25. Accordingly, the hybrid vehicle according to this embodiment of the present invention can be driven in three modes, the first being an engine drive mode limited to use of the engine output, the second being a motor drive mode limited to use of the motor output and the third being an engine-motor drive mode using both outputs from engine 11 and motor 25. Generator 16 operates under control to regulate the rotational speed of transmission shaft 17 so that engine 11 can be run at peak efficiency.

Figure 3:
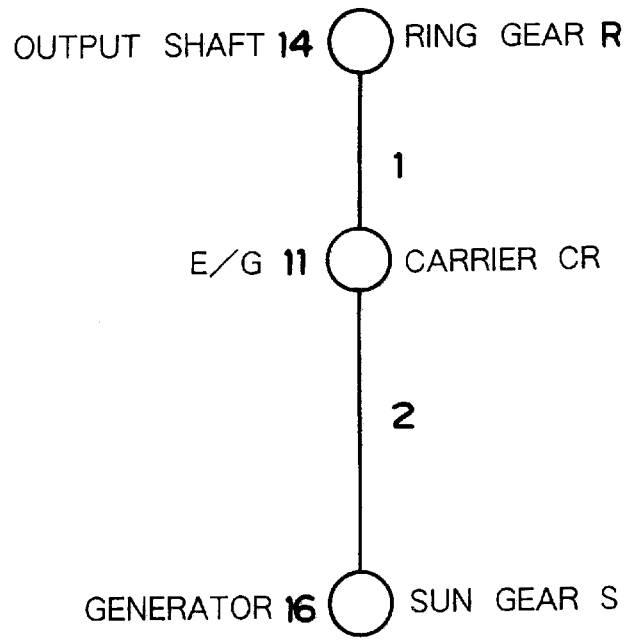
FIG. 3 is a schematic view diagrammatically showing operation of a planetary gear unit of the hybrid vehicle according to the first embodiment.

With the above-described drive unit in which ring gear R, carrier CR and sun gear S of planetary gear unit 13 are connected to output shaft 14, engine 11 and generator 16, respectively, ring gear R has teeth double sun gear S, as shown in FIG. 3. Accordingly, the output torque $T_O$ at output shaft 14, the engine torque $T_E$ and the generator output torque $T_G$ has the following ratios:

$$T_E : T_O : T_G = 3 : 2 : 1$$

Figure 4:
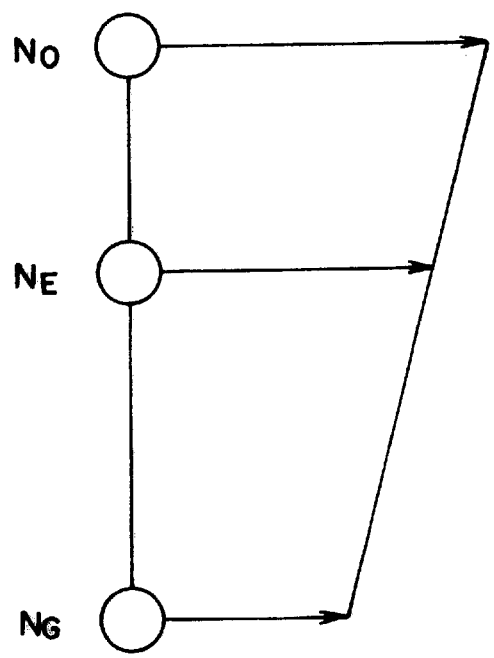
FIG. 4 shows an engine speed variation at normal driving in the first embodiment.
Figure 5:
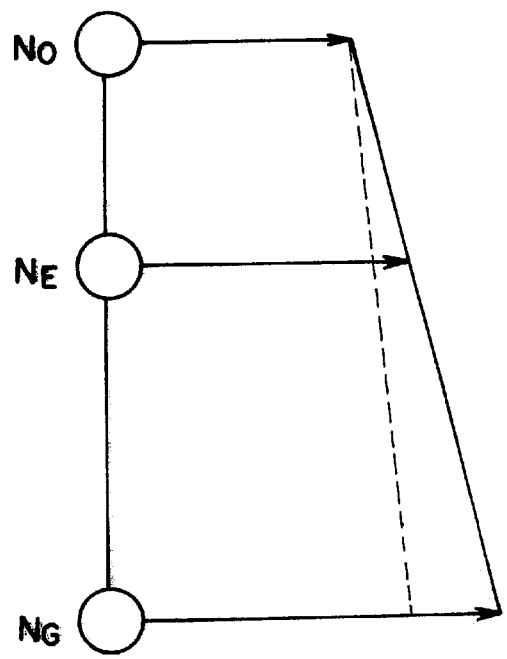
FIG. 5 shows an engine speed variation when the generator is uncontrollable.

In normal driving, the output speed $N_O$ of output shaft 14, the engine speed $N_E$ and the generator speed $N_G$ has relationship as shown in FIG. 4. However, if generator 16 becomes uncontrollable by some reason such as accident to a control system of the generator, cutoff of a line from a power source, short circuit of a stator coil, etc., the output shaft speed No remains substantially unchanged because of inertia of the hybrid vehicle, whereas the engine speed $N_E$ increases with the engine torque $T_E$, which greatly increases the generator speed $N_G$, as shown in FIG. 5. In accordance with the present invention, the excessive increase of the generator speed $N_G$ is prevented by controlling the engine speed $N_E$.

Figure 1:
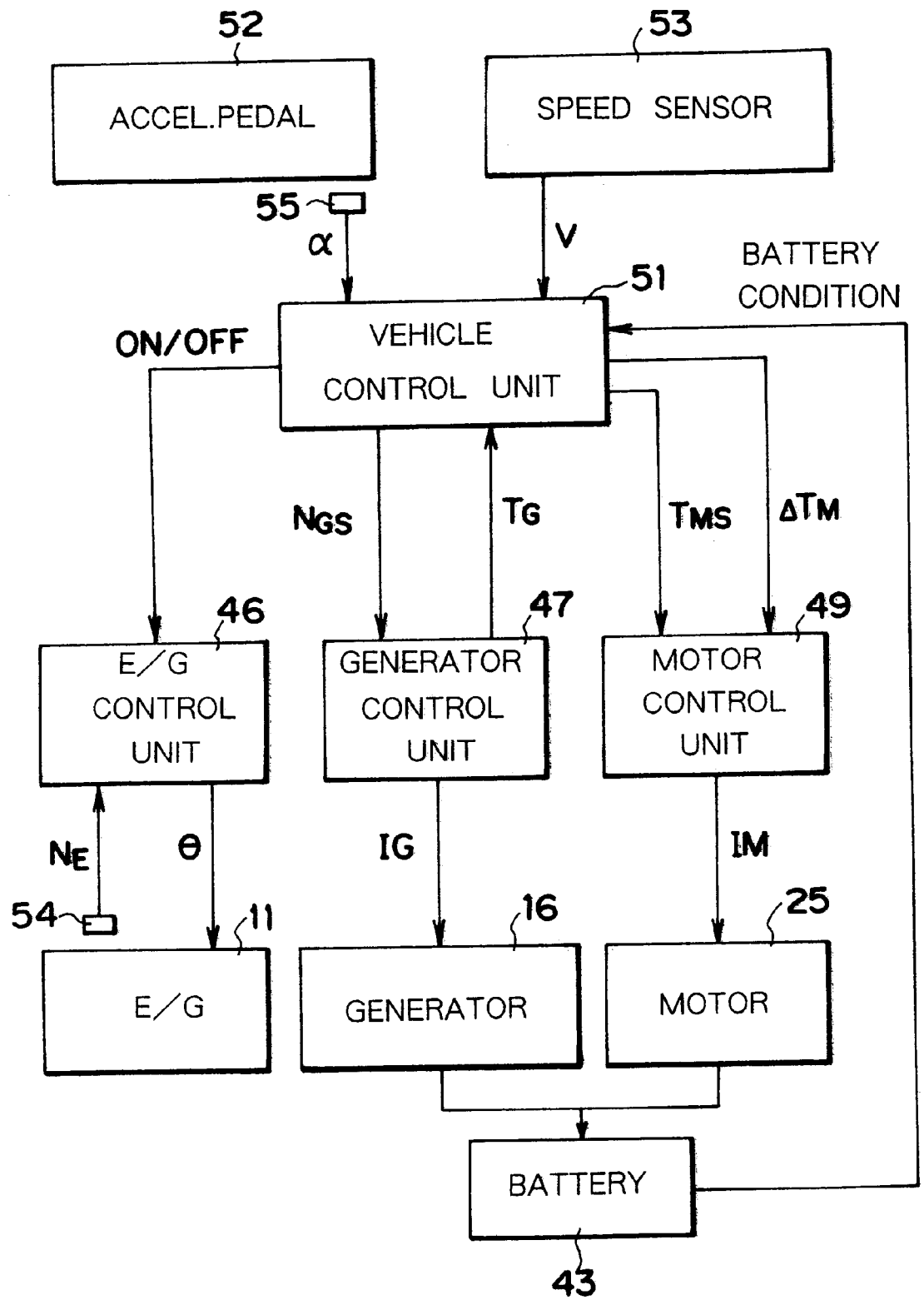
FIG. 1 is a block diagram of an overall control system of a hybrid vehicle according to a first embodiment of the present invention.

Specifically referring to FIG. 1 showing an overall control system of the hybrid vehicle of the first embodiment, engine 11, generator 16, motor 25 and battery 43 have already been described in reference to FIG. 2. The control system includes an engine control unit 46, a generator control unit 47 and a motor control unit 49. Engine control unit 46 receives the engine speed $N_E$ which is detected by an engine speed sensor 54, thereby producing a command signal θ to engine 11 for regulating the throttle opening, for example. Generator control unit 47 produces an electricity command signal IG to generator 16. Motor control unit 49 produces another electricity command signal IM to motor 25.

A vehicle control unit 51, including a CPU and memory devices (not shown), receives a stepping amount α of an accelerator pedal 52 which is detected by an accelerator switch 55, a vehicle speed V detected by a speed sensor 53, the generator torque TG detected by generator control unit 47, and the charge condition of the battery 43 to thereby control the vehicle, including producing a signal indicating ON/OFF of engine 11 to engine control unit 46, setting a target speed $N_{GS}$ at generator control unit 47, setting a target torque $T_{MS}$ a revised torque $\Delta T_M$ at motor control unit 25. Vehicle speed sensor 53 in this embodiment detects the rotation speed No of output shaft 14 (FIG. 2), but it may detect the rotation speed of ring gear R, the wheel rotation and any other parameter from which the vehicle speed can be calculated.

Figure 6:
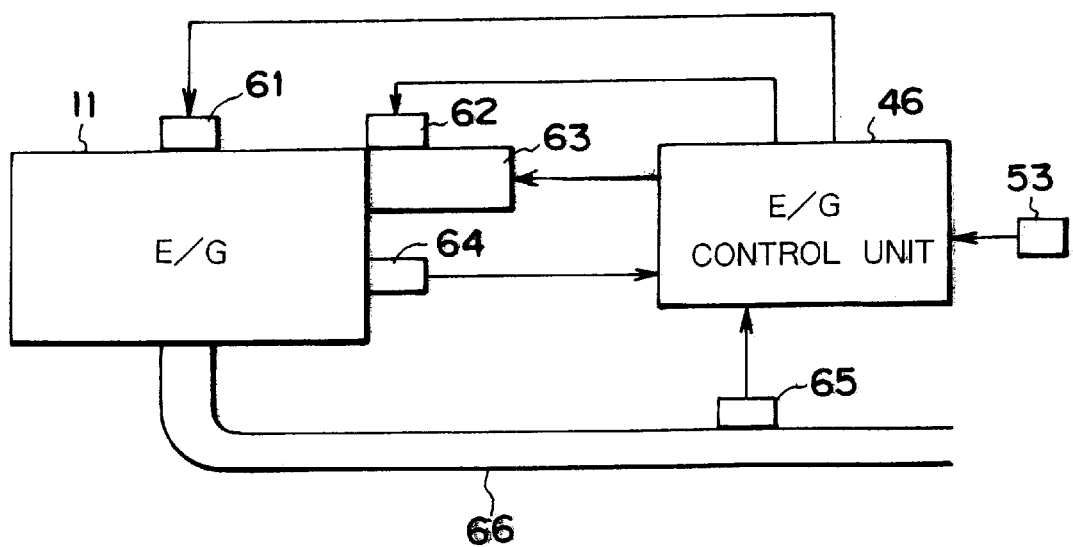
FIG. 6 is a schematic view of an engine control system of the hybrid vehicle according to the first embodiment.

The engine control system will be described in more detail in further reference to FIG. 6 in which the same elements as those in FIG. 1 are indicated by the same reference numerals. An ignitor 61 is controlled by engine control unit 46 to ignite engine 11. A fuel injector 62 is also controlled by engine control unit 46 to inject a controlled amount of fuel into cylinder (not shown) of engine 11, after the injected fuel is mixed with air introduced through a controlled opening of a throttle 63. A crank position sensor 64 detects a crank position (not shown) in engine 11, and an oxygen sensor 65 is secured to an exhaust pipe 65 to detect an amount of oxygen in the exhaust gas from engine 11.

Since vehicle speed sensor 53 detects the rotation speed No of output shaft 14 as the vehicle speed V, the engine speed $N_E$ can be expressed as a function of the generator speed $N_G$ and the vehicle speed V. Accordingly, the maximum engine speed $N_{EMAX}$ can be expressed as a function of the vehicle speed which is as follows:

$$N_{EMAX} = f(V) \qquad (1)$$
$$= k1 \cdot V + k2 \cdot N_{GMAX}$$

where k1 is a constant determined solely by a gear ratio at the time when generator 16 is stopped by engagement with brake B (approximately 25 at the vehicle speed of 60 km/h and the engine speed of 1500 rpm); K2 is a constant determined by a gear ratio of planetary gear unit 13 (approximately 3.0); and $N_{GMAX}$ is the maximum generator speed determined by design strength of generator 16.

Figure 7:
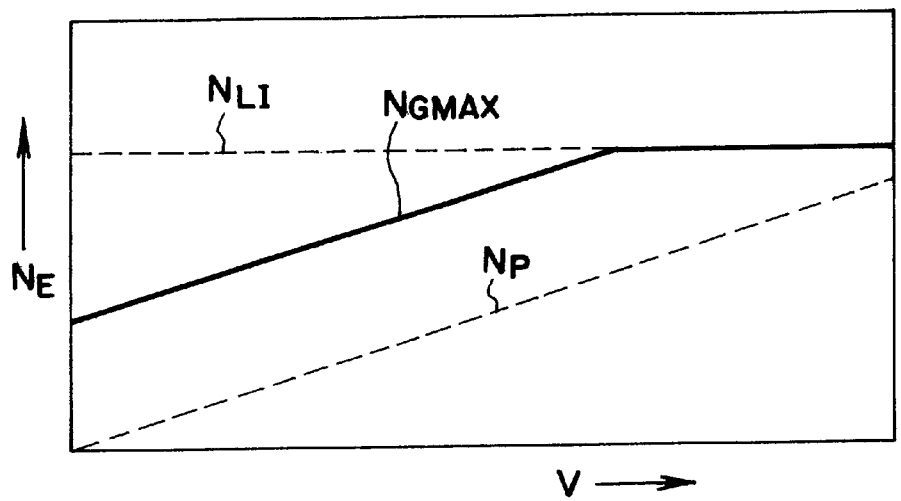
FIG. 7 is an engine speed map of the hybrid vehicle according to the first embodiment.
Figure 8:
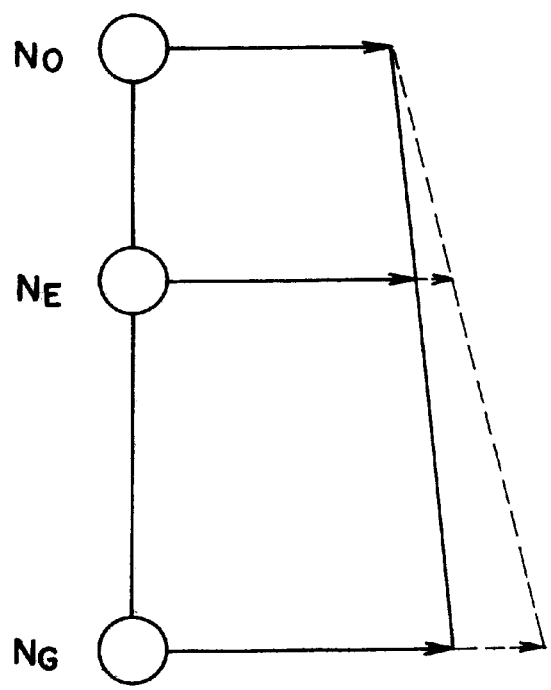
FIG. 8 shows an engine speed variation when the generator is controlled in the hybrid vehicle of the first embodiment.

Vehicle control unit 51 makes reference to an engine speed map of FIG. 7, which is stored in the memory device of vehicle control unit 51, to determine the upper limit $N_{EMAX}$ of the engine speed $N_E$ at the vehicle speed V detected by vehicle speed sensor 53, and thus controls engine 11 such that the actual engine speed $N_E$ does not exceed the determined maximum engine speed $N_{EMAX}$. The map of FIG. 7 also shows the upper limit of the engine speed $N_{LI}$ determined by a particular design of engine 11, and the parallel speed $N_P$ at the time when rotor 21 is caused to stop by engagement with brake B. In a modified embodiment, the maximum engine speed $N_{EMAX}$ may be determined from the above equation (1).

Accordingly, when the actual engine speed $N_E$ reaches the maximum engine speed $N_{EMAX}$, engine control unit 46 controls fuel injector 62 to reduce the fuel quantity injected therefrom to reduce the engine torque $T_E$. Thus, the actual engine speed $N_E$ can be prevented from excessive increase beyond the predetermined upper limit $N_{EMAX}$. In modified embodiments, reduction of the engine torque $T_E$ may be done by interrupting ignitor 61 to stop engine 11, reducing the throttle opening θ, changing the ignition timing by ignitor 61, valve opening timing or compression ratio, which is controlled by engine control unit 46.

With the above-described hybrid vehicle including means for restricting the engine torque $T_E$ to thereby restrict the engine speed $N_E$, even in case of emergency which causes generator 16 to be in an uncontrollable situation, resulting from, for example, accident to generator control unit 47, cutoff of a line from a power source to generator 16, short circuit of coil 23 of generator 16, etc., it is possible to prevent extraordinary increase of the generator speed $N_G$. There is no need to detect the generator speed $N_G$, which enables reliable protection to generator without any control signal from generator control unit 47.

FIG. 9 shows a drive unit of the hybrid vehicle in accordance with a second embodiment of the present invention, in which the same elements are indicated by the same reference numerals as in FIG. 2. In the drive unit of FIG. 9, to an engine output shaft 12 is connected a double rotary type generator (G) 70 having an output shaft 14 with a counter drive gear 75. Generator 70 has a stator 72, a rotor 71 coaxially and relatively rotatably arranged within stator 72, and a coil 73 wound around rotor 71. Stator 72 is connected to engine 11 through output shaft 12, whereas rotor 71 is connected to an electric motor (M) 25 through output shaft 71. Generator 70 receives rotation of engine output shaft 12 to generate electricity, which is charged to a battery (not shown) connected to coil 73.

Motor 25 has a free-rotatable rotor 37 secured to output shaft 14, a stator 38 arranged around rotor 37 and a coil 39 wound around stator 38, so that it outputs rotary power or torque with electricity supplied to coil 39 from the battery. Motor 25 receives rotation of drive wheels (not shown) to produce a regenerative electricity which is supplied to the battery for charging.

A counter shaft 31 with a counter driven gear 32 and a pinion gear 33 rotates the drive wheels in the same direction as engine 11. Counter driven gear 32 meshes with counter drive gear 75 on output shaft 14 so that it is driven by gear 75 to rotate in the opposite direction. A differential gear unit 36 is secured to a ring gear 35 which meshes with pinion gear 33, having less teeth than gear 32, so that rotation received by ring gear 35 is transmitted to and changed into differential motion in differential gear unit 36 to thereby drive the wheels.

The drive unit of FIG. 9 further includes a vehicle speed sensor (not shown), which detects the rotating speed of output shaft 14 as a vehicle speed V, from which the engine speed is controlled in such manner as described in the first embodiment. Accordingly, even if generator 70 becomes uncontrollable due to some accident to a generator control unit 47 (FIG. 1), cutoff of a line from a power source to generator 70, short circuit of coil 73 of generator 70, etc., the engine speed is controlled below the predetermined upper limit N$_{EMAX}$ to prevent extraordinary raise of the generator speed, i.e., relative rotation speed between rotor 71 and stator 72.

Although the present invention has been described in conjunction with specific embodiments thereof, it is to be understood that it is capable of considerable variation and modification without departure from the scope of the appended claims.

What is claimed is:

1. A hybrid vehicle comprising an internal combustion engine for generating mechanical energy; a generator for converting said mechanical energy into electricity; an electric motor driven by said electricity to output rotational power through an output shaft; a differential gear unit including at least three gear elements, the first being connected to said generator, the second being connected to said output shaft and the third being connected to said internal combustion engine; a speed sensor for detecting an output rotational speed of said second gear element; and a controller operated in response to the output rotational speed detected by said speed sensor to control speed of said engine so as not to exceed an upper limit predetermined to prevent an excessive increase in generator speed.

2. A hybrid vehicle according to claim 1 wherein said controller controls said engine speed based on a current vehicle speed which is determined by said output rotational speed of said second gear element detected by said speed sensor.

3. A hybrid vehicle according to claim 2 wherein said controller stores a map showing relationship between recommended upper limit of said engine speed and said vehicle speed, and controls said engine speed not to exceed said recommended upper limit speed at said current vehicle speed, in reference to said map.

4. A hybrid vehicle according to claim 1 wherein said controller controls said engine speed by reducing an engine torque produced by said engine.

5. A hybrid vehicle according to claim 1, wherein said predetermined upper limit for engine speed is predetermined as a function of a maximum generator speed determined by design of the generator.

6. A hybrid vehicle according to claim 5, wherein said controller comprises a memory containing a map of vehicle speed versus values for the predetermined upper limit for engine speed, said controller calculating vehicle speed from the detected output rotational speed and applying the calculated vehicle speed to said map to determine an upper limit for engine speed not to be exceeded.

7. A hybrid vehicle according to claim 1 wherein said predetermined upper limit for engine speed N$_{EMAX}$ is calculated as:

$$N_{EMAX} = k1 \cdot V + K2 \cdot N_{GMAX}$$

wherein:

k1 is a constant determined solely by a gear ratio with said generator stopped;

K2 is a constant determined by a gear ratio of said differential gear unit;

V is a vehicle speed calculated from the detected output rotational speed; and

N$_{GMAX}$ is the maximum generator speed determined by design of said generator.

8. A hybrid vehicle according to claim 7 wherein said controller comprises a memory containing a map of values for V versus values for N$_{EMAX}$ and wherein said controller applies a value V, calculated from a current detected output rotational speed, to said map to determine an upper limit for engine speed not to be exceeded.

9. A hybrid vehicle comprising an internal combustion engine for generating mechanical energy; a generator for converting said mechanical energy into electricity; an electric motor driven by said electricity to output rotational power through an output shaft; a differential gear unit including at least three gear elements, the first being connected to said generator, the second being connected to said output shaft and the third being connected to said internal combustion engine; a speed sensor for detecting an output rotational speed of said second gear element; and a controller operated in response to the output rotational speed detected by said speed sensor to control an engine torque produced by said engine so as not to exceed an upper limit predetermined to prevent an excessive increase in generator speed.

10. A hybrid vehicle according to claim 9 wherein said controller controls said engine torque based on a current vehicle speed which is determined by said output rotational speed of said second gear element detected by said speed sensor.

11. A hybrid vehicle according to claim 9 wherein said controller is operated to reduce an engine throttle opening to thereby restrict said engine torque.

12. A hybrid vehicle according to claim 9 wherein said controller is operated to reduce a quantity of fuel to be injected into said engine to thereby restrict said engine torque.

13. A hybrid vehicle according to claim 9 wherein said controller is operated to stop ignition to said engine or change ignition timing to thereby restrict said engine torque.

14. A hybrid vehicle according to claim 9 wherein said controller is operated to change compression ratio of a gas mixture to be introduced into said engine to thereby restrict said engine torque.

15. A hybrid vehicle according to claim 9 wherein said controller is operated to change open/close timing of valves in said engine to thereby restrict said engine torque.

16. A hybrid vehicle comprising an internal combustion engine or generating mechanical energy; a double rotary generator including a first rotor connected to said engine and a second rotor, rotatable relative to said first rotor, connected to an output shaft, said generator converting said mechanical energy into electricity; an electric motor driven by said electricity to output rotational power through said output shaft; a speed sensor for detecting an output rotational speed of said output shaft; and a controller operated in response to the output rotational speed detected by said speed sensor to control a speed of said engine not to exceed a predetermined upper limit speed.

17. A hybrid vehicle according to claim 16 wherein said controller controls said engine speed based on a current vehicle speed which is determined by said output rotational speed of said output shaft detected by said speed sensor.

18. A hybrid vehicle according to claim 16 wherein said controller stores a map showing relationship between recommended upper limit of said engine speed and said vehicle speed, and controls said engine speed not to exceed said recommended upper limit speed at said current vehicle speed, in reference to said map.

19. A hybrid vehicle according to claim 16 wherein said controller controls said engine speed by reducing an engine torque produced by said engine.

20. A hybrid vehicle comprising an internal combustion engine for generating mechanical energy; a double rotary generator including a first rotor connected to said engine and a second rotor, rotatable relative to said first rotor, connected to an output shaft, said generator converting said mechanical energy into electricity; an electric motor driven by said electricity to output rotational power through said output shaft; a speed sensor for detecting an output rotational speed of said output shaft; and a controller operated in response to the output rotational speed detected by said speed sensor to control an engine torque produced by said engine.

21. A hybrid vehicle according to claim 20 wherein said controller controls said engine torque based on a current vehicle speed which is determined by said output rotational speed of said output shaft detected by said speed sensor.

22. A hybrid vehicle according to claim 20 wherein said controller is operated to reduce an engine throttle opening to thereby restrict said engine torque.

23. A hybrid vehicle according to claim 20 wherein said controller is operated to reduce a quantity of fuel to be injected into said engine to thereby restrict said engine torque.

24. A hybrid vehicle according to claim 20 wherein said controller is operated to stop ignition to said engine or change ignition timing to thereby restrict said engine torque.

25. A hybrid vehicle according to claim 20 wherein said controller is operated to change compression ratio of a gas mixture to be introduced into said engine to thereby restrict said engine torque.

26. A hybrid vehicle according to claim 20 wherein said controller is operated to change open/close timing of valves in said engine to thereby restrict said engine torque.

* * * * *